(12) United States Patent
Sun et al.

(10) Patent No.: US 8,865,348 B2
(45) Date of Patent: Oct. 21, 2014

(54) POSITIVE ACTIVE MATERIAL COMPRISING A CONTINUOUS CONCENTRATION GRADIENT OF A METAL COMPOSITION FOR LITHIUM BATTERY, METHOD OF PREPARING THE SAME, AND LITHIUM BATTERY INCLUDING THE SAME

(75) Inventors: Yang-Kook Sun, Seoul (KR); Byung-Chun Park, Seoul (KR)

(73) Assignee: Industry-University Cooperation Foundation, Hanyang University, Seoul (KR)

(*) Notice: Subject to any disclaimer, the term of this patent is extended or adjusted under 35 U.S.C. 154(b) by 1453 days.

(21) Appl. No.: 12/279,033

(22) PCT Filed: Dec. 27, 2006

(86) PCT No.: PCT/KR2006/005767
§ 371 (c)(1),
(2), (4) Date: Aug. 11, 2008

(87) PCT Pub. No.: WO2007/114557
PCT Pub. Date: Oct. 11, 2007

(65) Prior Publication Data
US 2009/0068561 A1  Mar. 12, 2009

(30) Foreign Application Priority Data

Mar. 30, 2006 (KR) .......................... 10-2006-0028861

(51) Int. Cl.
H01M 4/134 (2010.01)
H01M 4/13 (2010.01)
H01M 4/02 (2006.01)
H01M 4/08 (2006.01)
H01M 4/525 (2010.01)
H01M 4/131 (2010.01)
H01M 4/505 (2010.01)
H01M 10/052 (2010.01)

(52) U.S. Cl.
CPC .............. *H01M 4/131* (2013.01); *H01M 4/525* (2013.01); *Y02E 60/122* (2013.01); *H01M 2004/021* (2013.01); *H01M 10/052* (2013.01); *H01M 4/505* (2013.01); *Y02T 10/7011* (2013.01)
USPC ........................ 429/223; 429/209; 252/519.15

(58) Field of Classification Search
None
See application file for complete search history.

(56) References Cited

U.S. PATENT DOCUMENTS 6,040,090 A   3/2000  Sunagawa et al.
6,274,273 B1  8/2001  Cho et al.
(Continued)

FOREIGN PATENT DOCUMENTS

EP  0872450 A1  10/1998
EP  0918041 A1  5/1999
(Continued)

OTHER PUBLICATIONS

J.R. Dahn, E.W. Fuller, M. Obrovac, U. von Slaken; *Thermal Stability of $Li_xCoO_2$, $Li_xNiO_2$, and $\lambda$-$MnO_2$ and consequences for the safety of Li-ion cells*; Solid State Ionics 69; 1994; pp. 265-270.

(Continued)

*Primary Examiner* — Kwang Han
(74) *Attorney, Agent, or Firm* — Lucas & Mercanti, LLP

(57) ABSTRACT

A positive active material according to one embodiment of the present invention includes an internal bulk part and an external bulk part surrounding the internal bulk part and has a continuous concentration gradient of the metal composition from an interface between the internal bulk part and the external bulk part to the surface of the active material. The provided positive active material in which the metal composition is distributed in a continuous concentration gradient has excellent electrochemical characteristics such as a cycle life, capacity, and thermal stability.

17 Claims, 10 Drawing Sheets

(56) References Cited

U.S. PATENT DOCUMENTS

| | | | |
|---|---|---|---|
| 6,555,269 | B2 | 4/2003 | Cho et al. |
| 2001/0016285 | A1 | 8/2001 | Cho et al. |
| 2003/0087155 | A1 | 5/2003 | Cho et al. |
| 2004/0096743 | A1 | 5/2004 | Okae et al. |
| 2007/0122705 | A1* | 5/2007 | Paulsen et al. ............. 429/231.3 |

FOREIGN PATENT DOCUMENTS

| | | | |
|---|---|---|---|
| JP | 07-235292 A | 9/1995 | |
| JP | 1996171910 A | 7/1996 | |
| JP | 2000227858 A | 8/2000 | |
| JP | 2002001724 A | 1/2002 | |
| JP | 2002201028 A | 7/2002 | |
| JP | 2003059490 A | 2/2003 | |
| JP | 2003068299 A | 3/2003 | |
| JP | 2003086182 A | 3/2003 | |
| JP | 2003197256 A | 7/2003 | |
| JP | 2003203633 A | 7/2003 | |
| JP | 2003238165 | 8/2003 | |
| JP | 2003242976 A | 8/2003 | |
| JP | 2004-87299 A | 3/2004 | |
| JP | 2007-213866 A | 8/2007 | |
| KR | 1020010081181 A | 8/2001 | |
| KR | 1020030033716 A | 5/2003 | |
| KR | 1020040007356 A | 1/2004 | |
| KR | 1020040095837 A | 11/2004 | |
| KR | 1020050083869 A | 8/2005 | |
| KR | 577240 | 3/2006 | |
| WO | WO 2004/040677 * | 5/2004 | .............. H01M 4/58 |
| WO | WO 2004/040677 A1 | 5/2004 | |

OTHER PUBLICATIONS

T. Ohzuku, A. Ueda, N. Yamamoto; *Zero-Strain Insertion Material of $Li[Li_{1/3}Ti_{5/3}]O_4$ for Rechargeable Lithium Cells*; J. Electrochem. Soc.; May 1995; pp. 1431-1435; vol. 142, No. 5.

Z. Chen, J.R. Dahn; *Studies of $LiCoO_2$ Coated with Metal Oxides*; Electrochemical and Solid State Letters; 2003; pp. A221-A224; vol. 6.

J. Cho, Y.J. Kim, T-J. Kim, B. Park; *Effect of $Al_2O_3$-Coated o-$LiMnO_2$ Cathodes Prepared at Various Temperatures on the 55° C Cycling Behavior*; Journal of the Electrochemical Society; 2002; pp. A127-A132; vol. 149.

S-H. Kang, J. Kim, M.E. Stoll, D. Abraham, Y.K. Sun, K. Amine; *Layered $Li(Ni_{0.5-x}Mn_{0.5-x}M'_{2x})O_2$ (M'=Co, Al, Ti; x=0, 0.025) cathode materials for Li-ion rechargeable batteries*; Journal of Power Souces; 2002; pp. 41-48; vol. 12.

PCT International Search Report; PCT/KR2006/005767; Apr. 2007; 8 pages.

* cited by examiner

US 8,865,348 B2

POSITIVE ACTIVE MATERIAL COMPRISING A CONTINUOUS CONCENTRATION GRADIENT OF A METAL COMPOSITION FOR LITHIUM BATTERY, METHOD OF PREPARING THE SAME, AND LITHIUM BATTERY INCLUDING THE SAME

BACKGROUND OF THE INVENTION (a) Field of the Invention

The present invention relates to a positive active material for a lithium battery, a method of preparing the same, and a rechargeable lithium battery including the same. More particularly, the present invention relates to a positive active material for a lithium battery with excellent high-capacity and thermal stability, a method of preparing the same, and a rechargeable lithium battery including the same.

(b) Description of the Related Art

Lithium ion rechargeable batteries have been widely used as a power source for portable electronic device since 1991. Recently, electronic, communication, and computer industries have become remarkably developed to provide potable devices such as camcorders, cell phones, laptop computers, and so on. Therefore, the lithium ion batteries are required to supply the power for these portable electronic devices. Particularly, a lithium rechargeable battery used as a power source for a hybrid electric vehicle also having an internal combustion engine is being actively researched in the United States, Japan, Europe, and so on.

A high capacity battery for an electric vehicle is the initial stage of development. Generally, a nickel hydrogen battery is used due to the safety thereof, but the lithium ion battery is advantageous in terms of energy density. However, the lithium ion batteries still have problems of both a high price and safety to be solved. Particularly, both $LiCoO_2$ and $LiNiO_2$ positive active materials that are commercially available have an unstable crystal structure due to de-lithiation upon charging the battery, and thus the thermal characteristics are fatally deteriorated. That is, when the overcharged battery is heated to 200-270° C., the structure is remarkably deformed, and thus a reaction of emitting oxygen is carried out by deforming the structure in the lattice (J. R. Dahn et al., Solid State Ionics, 69, 265, 1994).

Concurrently commercially available small lithium ion rechargeable batteries generally include a positive active material of $LiCoO_2$. $LiCoO_2$ is a material having stable charge and discharge characteristics, high stability, and a smooth discharge voltage, but as Co is a rare material and its cost is high, and it is toxic to people, alternative positive electrode materials to replace Co are required. Although $LiNiO_2$ having a layered structure similar to $LiCoO_2$ has a high discharge capacity, it has not commercially developed due to its unstable thermal and life-cycle characteristics as well as its lack of safety at a high temperature. In order to solve these problems, it has been attempted to substitute some nickel with transition elements so that the exothermic temperature is increased and to make a broad exothermal peak such that a rapid exothermal reaction is inhibited (T. Ohzuku et al., J. Electrochem. Soc., 142, 4033, 1995, No. 9-237631). However, the results have not yet been confirmed.

In addition, $LiNi_{1-x}Co_xO_2$ (x=0.1-0.3) materials in which some nickel is substituted with thermally stable cobalt shows good charge-discharge and cycle-life characteristics, but it cannot provide a thermally stable battery. A Li—Ni—Mn-based composite oxide in which some Ni is substituted with thermally stable Mn and a Li—Ni—Mn—Co-based composite oxide in which some Ni is substituted with Mn and Co and methods of preparing the same have been suggested.

For example, the Japanese Patent laid-open Publication Hei 08-171910 discloses a method of preparing a positive active material of $LiNi_xMn_{1-x}O_2$ (0.7≤x≤0.95) including mixing a solution of Mn-included salt and Ni-included salt with an alkaline solution to co-precipitate Mn and Ni, mixing the co-precipitation with a lithium hydroxide, and firing the same.

Recently, Japanese Patent laid-open Publication No. 2000-227858 disclosed a positive active material in which Mn and Ni compounds were uniformly distributed at an atomic level to provide a solid solution instead of the transition elements being partially substituted into $LiNiO_2$ or $LiMnO_2$. However, according to European Patent No. 0918041 or U.S. Pat. No. 6,040,090, although $LiNi_{1-x}Co_xMn_yO_2$ (0≤y≤0.3) has improved thermal stability compared to that of materials composed of only Ni and Co, the reactivity of $Ni^{4+}$ with the electrolyte solution sets a limit on commercialization. In addition, European Patent No. 0872450A1 discloses $Li_aCo_b$-$Mn_cM_dNi_{1-(b+c+d)}O_2$ (M=B, Al, Si, Fe, Cr, Cu, Zn, W, Ti, or Ga) in which Ni was substituted with another metal as well as Co and Mn. However, as the active materials disclosed in these patents still include Ni, the thermal stability of the active material is not fully satisfied.

The most spotlighted alternatives to $LiCoO_2$ may include $Li[Ni_{1/2}Mn_{1/2}]O_2$ and $Li[Ni_{1/3}CO_{1/3}Mn_{1/3}]O_2$ having a layered structure in which nickel-manganese and nickel-cobalt-manganese are mixed at a ratio of 1:1 or 1:1:1, respectively. Although the materials have advantages of lower cost, higher capacity, and superior thermal stability than $LiCoO_2$, they show deteriorated high capacity characteristics and lower temperature characteristics due to lower electronic conductivity than $LiCoO_2$. In addition, even though the capacity is higher than that of $LiCoO_2$, the energy density of the battery including the same is not improved due to its low tap density. Particularly, as these materials have low electronic conductivity (J. of Power Sources, 112, 2002, 41-48), the high power characteristics thereof are inferior to those of $LiCoO_2$ or $LiMn_2O_4$ when used in a hybrid power source for electric vehicles.

$Li[Ni_{1/2}Mn_{1/2}]O_2$ and $Li[Ni_{1/3}CO_{1/3}Mn_{1/3}]O_2$ can be prepared by simultaneously precipitating two or three elements in an aqueous solution using a neutralization reaction to provide a hydroxide or an oxide precursor, mixing the precursor with lithium hydroxide, and firing the same. Unlike the general co-precipitation reaction, the co-precipitated particle including manganese is shaped as an irregular plate and has a half tap density comparable to that of nickel or cobalt. For example, according to Japanese Patent laid-open Publication No. 2002-201028, a conventional reactor was used according to the inert precipitation process and the generated precipitate particles were widely distributed and each of the particles had a different primary particle shape. In addition, Japanese Patent laid-open Publication Nos. 2003-238165, 2003-203633, 2003-242976, 2003-197256, 2003-86182, 2003-68299, and 2003-59490, and Korean Patent Nos. 0557240 and 0548988, disclose a method of preparing a high capacity positive active material in which charge and discharge reversibility and thermal stability were improved by dissolving a nickel salt and a manganese salt, or a nickel salt, a manganese salt, and a cobalt salt in an aqueous solution, simultaneously introducing an alkali solution into a reactor while introducing reductants or an inert gas to provide a metal hydroxide or an oxide precursor, mixing the precursor with lithium hydroxide, and firing the same.

As described above, lithium transition element-based oxide having the R3m layered crystal structure includes $LiCoO_2$, $LiNiO_2$, $LiNi_{1-x}Co_xO_2$, $LiNi_{1-x-y}Co_xM_yO_2$ (M=Mn, Al, Mg, Ti, $Ti_{1/2}Mg_{1/2}$), $LiNi_{1/3}CO_{13}Mn_{1/3}O_2$, $LiNi_{1/2}Mn_{1/2}O_2$, $LiNi_xCO_{1-2x}Mn_xO_2$, and $Li_{1+z}[Ni_xCo_{1-2x}Mn_x]_{1-z}O_2$. Generally, such materials have a uniform metal composition between the particle surface and the body thereof. In order to provide excellent positive electrode performance, it is required to provide different functions to each of the inside and the surface of positive electrode powder particles. In other words, the composition of the inside of the particles has a lot of space for intercalating/deintercalating lithium ions, and the structure is stable as long as reaction with the electrolyte on the surface is minimized.

Proposals for changing the surface composition of the positive active material include a surface coating treatment. Such surface treatment includes coating the surface in a small amount of 1-2 wt % or less based on the total weight of the positive active material to provide a nanometer-thin coating layer, and heating the same after the coating step to provide a solid solution on the surface of the powder particle so that the metal composition thereof is different from that of the inside of the particle (J. Cho et al., J. Electrochem. Soc., 149, A127, 200; J. Dahn et al., Electrochem. and Solid State Lett., 6, A221 2003, U.S. Pat. No. 6,555,269, U.S. Pat. No. 6,274, 273). When the coating layer is formed on the surface by coating and heating, the surface layer bound with the coating material has a depth of several tens or less nanometers and is different from the particle body. Thereby, it causes problems in that the coating efficiency is deteriorated after repeating several cycles. Further, the coating is not uniformly distributed on the surface so that the efficiency of coating is reduced.

In order to overcome such problems, Korean Patent Laid-open Publication No. 2005-0083869 disclosed a lithium transition element having a concentration gradient of the metal composition. After synthesizing the inner material, it is covered with a different composition on the surface thereof to provide a two-layered material. Then, it is mixed with lithium salt and subjected to heat treatment. The inner material may include a commercially available lithium transition element oxide.

According to this method, the different metal compositions for the inner layer and the outer layer may be synthesized, and the metal composition is not continuously varied. By the heat treatment, it is possible to provide the metal composition with a gradual gradient, but the concentration gradient of the metal ion is rarely generated due to thermal diffusion at a temperature higher than 850° C. Further, the synthesized powder has a low tap density since the chelating agent of ammonia is not used, so it is not suitable for a positive active material for a lithium rechargeable battery. Further, according to the method, it is hard to control the lithium amount of the outer layer when the lithium transition element oxide is used for the inner material, so the reproducibility is deteriorated.

According to Japanese Patent No. 2002-001724, in order to improve the thermal stability and the cycle-life characteristics of the Ni-based positive active material, the composite positive active material $Li_{1.02}Ni_{0.65}Mn_{0.35}O_2$ of which the cycle-life characteristic and the thermal stability are excellent, but the conductivity and the discharge capacity are deteriorated, is mixed with $Li_{1.02}Ni_{0.7}Co_{0.3}O_2$ of which the conductivity and the discharge capacity are excellent, but the cycle-life characteristic and the thermal stability are deteriorated. The composite oxide improves the cycle-life characteristic by increasing the mixing ratio of the high stable composite oxide, and improves the high capacity characteristics by increasing the mixing ratio of the high conductivity composite oxide. However, a positive active material with both high capacity and excellent cycle-life characteristics has not been provided.

SUMMARY OF THE INVENTION

An exemplary embodiment of the present invention provides a positive active material for a lithium battery in which a metal composition is present in a continuous concentration gradient.

Another embodiment of the present invention provides a method of preparing a positive active material for a lithium battery in which a metal composition is present in a continuous concentration gradient.

Yet another embodiment of the present invention provides a lithium battery comprising a positive active material in which a metal composition is present in a continuous concentration gradient.

One embodiment of the present invention provides a positive active material for a lithium battery including an internal bulk part and an external bulk part surrounding the internal bulk part, wherein the metal composition is distributed in a continuous concentration gradient from the interface between the internal bulk part and the external bulk part to the surface of the positive active material. At least one of the internal bulk part and the external bulk part has a layered crystal structure. Herein, the metal composition of the external bulk part is distributed in a continuous concentration gradient.

The volume of the internal bulk part ranges from 35 to 95 volume % based on the total volume of positive active material.

The metal concentration in the surface part of the external bulk part is at least 10% more than that of the internal bulk part.

The internal bulk part includes a high capacity compound including Ni, Co, and Mn, and the external bulk part includes a thermally stable compound including Ni and Mn.

The internal bulk part includes lithium-included compounds represented by the following Formula 1, and the external bulk part is selected from the group consisting of compounds represented by the following Formula 2 and the following Formula 3, and a mixture thereof.

$$Li_aNi_{1-x-y-z}Co_xMn_yM_zO_{2-\delta}X_\delta \quad \text{Formula 1}$$

wherein, in the above formula, $0.95 \leq a \leq 1.2$, $0.01 \leq x \leq 0.5$, $0.01 \leq y \leq 0.5$, $0.005 \leq z \leq 0.3$, $0.05 \leq x+y+z \leq 0.4$, M is at least one element selected from the group consisting of Mg, Al, Cr, V, Ti, Cr, Fe, Zr, Zn, Si, Y, Nb, Ga, Sn, Mo, W, and combinations thereof, X is a halogen of F, Cl, Br, or I, and $0 \leq \delta \leq 0.1$.

$$Li_aNi_{1-x-y-z}Co_xMn_yM_zO_{2-\delta}X_\delta \quad \text{Formula 2}$$

wherein, in the above formula, $0.95 \leq a \leq 1.2$, $0.01 \leq x \leq 0.4$, $0.01 \leq y \leq 0.5$, $0.002 \leq z \leq 0.2$, $0.4 < x+y+z \leq 0.95$, M is at least one element selected from the group consisting of Mg, Al, Cr, V, Ti, Cr, Fe, Zr, Zn, Si, Y, Nb, Ga, Sn, Mo, W, and combinations thereof, X is a halogen of F, Cl, Br, or I, and $0 \leq \delta \leq 0.1$.

$$Li_aNi_xCo_{1-2x}Mn_{x-y}M_yO_{2-\delta}X_\delta \quad \text{Formula 3}$$

wherein, in the above formula, $0.95 \leq a \leq 1.2$, $0.01 \leq x \leq 0.5$, $0 \leq y \leq 0.1$, M is at least one element selected from the group consisting of Mg, Al, Cr, V, Ti, Cr, Fe, Zr, Zn, Si, Y, Nb, Ga, Sn, Mo, W, and combinations thereof, X is a halogen of F, Cl, Br, or I, and $0 \leq \delta \leq 0.1$.

The internal bulk part has an average particle diameter of 5 to 15 μm, and the positive active material particle has an average particle diameter of 10 to 30 μm.

Another embodiment of the present invention provides a method of preparing a positive active material for a lithium battery including: mixing a metal salt aqueous solution including nickel, cobalt, and an optional metal (M), wherein M is at least one element selected from the group consisting of Mg, Al, Cr, V, Ti, Fe, Zr, Zn, Si, Y, Nb, Ga, Sn, Mo, W, and combination thereof, a chelating agent, and a basic aqueous solution in a reactor to provide a first metal hydroxide precipitate; introducing metal mixture solutions with different concentrations to the reactor and simultaneously providing an ammonia aqueous solution and a basic aqueous solution thereto to form a second metal hydroxide precipitate on the surface of the first metal hydroxide precipitate such that the metal composition is distributed in a certain concentration gradient; drying or heating the provided precipitate to provide an active material precursor; and mixing the active material precursor with a lithium salt and heating the same.

The chelating agent and the metal salt aqueous solution are mixed in a mole ratio of 0.2 to 0.5:1.

The heating step of the mixture of the active material precursor and the lithium salt is carried out at a temperature of 700° C. to 1100° C.

Pre-firing the mixture of the active material precursor and the lithium salt at a temperature of 250 to 650° C. for 5 to 20 hours may be performed before the heating step.

The reactions in a first step and a second step are carried out under an atmosphere of inflowing nitrogen, pH of 10 to 12.5, at a reaction temperature of 30 to 80° C., and at a reaction agitation speed of 500 to 2000 rpm. Another embodiment of the present invention provides a lithium battery including the positive active material.

DETAILED DESCRIPTION OF THE INVENTION

Figure 1:
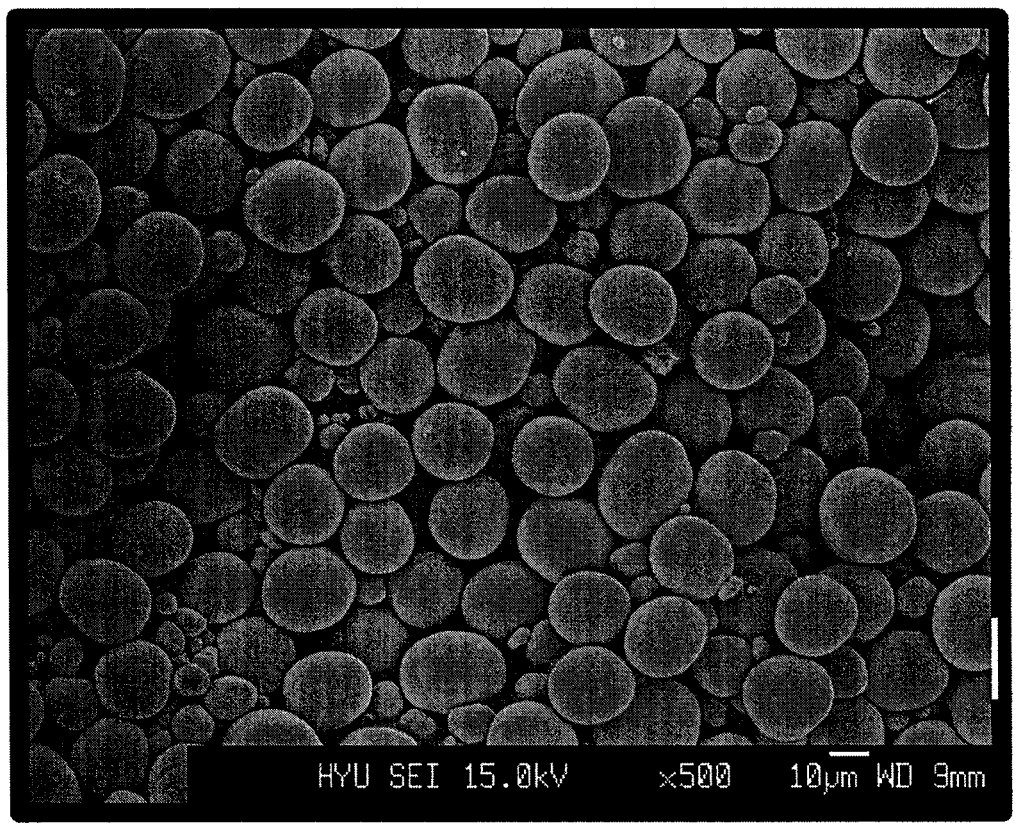
FIG. 1 is a 500-times magnified FE-SEM photograph showing a $([Ni_{0.8}Co_{0.13}Mn_{0.07}]_{0.6}[Ni_{0.4}Co_{0.4}Mn_{0.2}]_{0.4})$ $(OH)_2$ powder of the positive active material precursor fabricated from Example 1, which has a concentration gradient.

An exemplary embodiment of the present invention will hereinafter be described in detail with reference to the accompanying drawings.

The positive active material of one embodiment of the present invention includes an internal bulk part and an external bulk part surrounding the internal bulk part, wherein the metal composition is present in a continuous concentration gradient from the interface between the internal bulk part and the external bulk part to the surface of the active material.

The phrase "the metal composition is present in a continuous concentration gradient" denotes that the metal concentrations other than lithium are gradually increasing or decreasing in the concentration distribution. The concentration distribution means that the metal concentration is varied from 0.1 to 30 mole % per 0.1 μm from the outer surface of the internal bulk part to the outer surface of the external bulk part. According to another embodiment, the metal concentration is varied from 0.1 to 20 mole %. According to another embodiment, it ranges from 1 to 10 mole %.

The internal bulk part includes a center part of the active material particle and the surrounding part thereof. The external bulk part includes from the outer surface of the internal bulk part to the surface area of the external bulk part.

The volume of the internal bulk part ranges from 35 and 95 volume % based on the total volume of the positive active material. According to another embodiment, it ranges from 40 and 90 volume %. According to yet another embodiment, it ranges from 50 and 90 volume %. When the internal bulk part is less than 35 volume %, the discharge capacity is decreased. When it is more than 95 volume %, the thermal safety is deteriorated.

The average particle diameter of the internal bulk part ranges from 5 to 15 μm. According to another embodiment, it ranges from 5 and 13 μm. The average particle diameter of all particles of the positive active material ranges from 10 and 30 μm. According to another embodiment, it ranges from 13 to 25 μm. If the average particle diameter of the internal bulk part is less than 5 μm, the discharge capacity is decreased.

When it is more than 15 μm, the thermal stability is deteriorated. Further, if the particle diameter is less than 10 μm, it is hard to synthesize a material having a required concentration distribution. When it is more than 30 μm, the distance of transferring the lithium ions is too great, so the rate capability is deteriorated.

On the surface of the external bulk part, the metal concentration is increased at least 10 mole % based on that of the internal bulk part. According to another embodiment, it is increased from 10 mole % to 70 mole % more than that of the internal bulk part. According to yet another embodiment, the increase ranges from 15 mole % to 60 mole %. When the differentiation of the metal concentration is less than 10 mole %, it is hard to find the concentration distribution in the particle.

The internal bulk part includes a high-capacity compound including Ni, Co, and Mn, and the external bulk part includes a thermally stable compound including Ni and Mn.

The metal composition at the interface between the external bulk part and the internal bulk part is the same as in the internal bulk part, but the metal composition other than lithium in the external bulk part is distributed in a continuous gradient. In other words, the internal bulk part includes a lithium-included compound represented by the following Formula 1 (Ni composition in Formula 1 ranges from 60 mole % and 95 mole %) in which the Ni component is large and that has good safety and cycle-life characteristics, while the surface of the external bulk part that contacts the electrolyte includes: a lithium-included compound represented by the following Formula 2 (Ni composition in Formula 2 ranges from 5 mole % and 60 mole %) in which the Ni component is less and that has lesser safety and cycle-life characteristics, a lithium-included compound represented by Formula 3 in which the oxidation numbers of the transition elements are $Ni^{2+}$, $Co^{3+}$, or $Mn^{4+}$, or a mixture thereof. The lithium-included compound represented by Formula 2 or Formula 3 may be present in a mixed form in the external bulk part. Alternatively, the compound represented by Formula 2 and the compound represented by Formula 3 may be present in a bilayer form in the external bulk part.

$$Li_aNi_{1-x-y-z}Co_xMn_yM_zO_{2-\delta}X_\delta \quad \text{Formula 1}$$

wherein, in the above formula, $0.95 \leq a \leq 1.2$, $0.01 \leq x \leq 0.5$, $0.01 \leq y \leq 0.5$, $0.005 \leq z \leq 0.3$, $0.05 \leq x+y+z \leq 0.4$, M is at least one element selected from the group consisting of Mg, Al, Cr, V, Ti, Cr, Fe, Zr, Zn, Si, Y, Nb, Ga, Sn, Mo, W, and combinations thereof, X is a halogen of F, Cl, Br, or I, and $0 \leq \delta \leq 0.1$.

$$Li_aNi_{1-x-y-z}Co_xMn_yM_zO_{2-\delta}X_\delta \quad \text{Formula 2}$$

wherein, in the above formula, $0.95 \leq a \leq 1.2$, $0.01 \leq x \leq 0.4$, $0.01 \leq y \leq 0.5$, $0.002 \leq z \leq 0.2$, $0.4 < x+y+z \leq 0.95$, M is at least one element selected from the group consisting of Mg, Al, Cr, V, Ti, Cr, Fe, Zr, Zn, Si, Y, Nb, Ga, Sn, Mo, W, and combinations thereof, X is a halogen of F, Cl, Br, or I, and $0 \leq \delta 0.1$.

$$Li_aNi_xCo_{1-2x}Mn_{x-y}M_yO_{2-\delta}X_\delta \quad \text{Formula 3}$$

wherein, in the above formula, $0.95 \leq a \leq 1.2$, $0.01 \leq x \leq 0.5$, $0 \leq y \leq 0.1$, M is at least one element selected from the group consisting of Mg, Al, Cr, V, Ti, Cr, Fe, Zr, Zn, Si, Y, Nb, Ga, Sn, Mo, W, and combinations thereof, X is a halogen of F, Cl, Br, or I, and $0 \leq \delta \leq 0.1$.

When the external bulk part includes the lithium-included compound and the amount of Ni is less than 60 mole %, the $Ni^{4+}$ amount in the transition elements when the battery is fully charged is decreased and the thermal stability is improved. When it includes the lithium-included compound represented by Formula 3, the thermal stability is superior to that of $LiCoO_2$.

The internal bulk part of the active material that does not contact the electrolyte is designed to include a high capacity lithium-included compound having a high Ni amount. The surface of the active material (outer surface of external bulk part) that contacts the electrolyte is designed to include a lithium-included compound having a low Ni amount so that the stability is improved. Herein, the metal composition other than lithium in the external bulk part is distributed in a continuous concentration.

As the concentration of the metal composition is continuously distributed in the positive active material according to one embodiment of the present invention, a sharp boundary area is not formed on the interface between internal bulk part and the external bulk part and the crystal structure thereof is stable. In addition, since the external bulk part includes the lithium-included compound having thermally stable metal compositions that increase from the interface between the internal bulk part and the external bulk part to the surface of the active material, the thermal safety is improved.

Since $LiNiO_2$ for the positive active material has inferior thermal stability to that of $LiCoO_2$, and the swelling phenomenon is terrible at a high temperature, it is hard to commercialize. Such thermal instability is caused by the strong catalyst reaction of $Ni^{4+}$ in which the swelling phenomenon rapidly occurs upon contact with the electrolyte solution. Accordingly, as the external bulk part according to the present invention has a high density and few pores, it can prevent contact with $Ni^{4+}$ having high catalyst activity with the electrolyte solution and the swelling is remarkably improved.

Further, since the metal ion concentration is continuously varied from the inside of the positive active particle, the internal bulk part can have the high capacity characteristic. Further, as the reactivity of the particle surface with the electrolyte solution is minimized, the cycle-life characteristic is improved. In addition, as the metal ions are disposed on the surface of the particle by design, the battery safety at a high temperature is improved.

Hereinafter, a positive active material including the external bulk part in which the metal composition is distributed in a continuous concentration gradient is described as follows.

At the first step, a metal salt aqueous solution including nickel, cobalt, manganese, and an optional metal (M) (herein, M is same as M in the above Formula 1), a chelating agent, and a basic aqueous solution are mixed in a reactor to provide a spherical shaped first metal hydroxide precipitate. Such first metal hydroxide precipitate is present in the internal bulk part.

The metal salt aqueous solution is prepared by adding salts including nickel salt, cobalt salt, manganese salt, and M to a solvent, or by preparing aqueous solutions including each of the nickel salt, cobalt salt, manganese salt, and M salt and mixing these solutions. The metal salt may include sulfate, nitrate, acetate, halide, hydroxide, and so on, but it is not limited thereto as long as it can be dissolved in water. The metal salt aqueous solution is prepared by mixing nickel, cobalt, manganese, and metal (M) while controlling the mole ratio. The mole ratio can be easily calculated from Formula 1. The metal salt aqueous solution may have a concentration of 1M to 3M.

The chelating agent may include an ammonia aqueous solution, an ammonium sulfate aqueous solution, and the mixture thereof. The mole ratio of the chelating agent and metal salt aqueous solution may be 0.2 to 0.5:1, 0.2 to 0.4:1. The reason for setting the mole ratio of the chelating agent to 1 mole of the metal aqueous solution as 0.2 to 0.5 is to recovery the chelating agent which remains as an intermediate product. The chelating agent may be reacted with the metal at more than 1:1 to provide a composite that is reacted with caustic soda, and some chelating agents remain, then the remained chelating agents are recovered. In addition, it increases the crystallinity and stability of the positive active material.

The basic aqueous solution has a concentration of between 4M and 5M.

In more detail, a nickel salt, a manganese salt, a cobalt salt, and an optional metal (M) salt are dissolved in distilled water and introduced into a reactor simultaneously with a chelating agent and a basic aqueous solution to provide a precipitate. The co-precipitating process is one in which two or more elements are simultaneously precipitated in an aqueous solution according to the neutralization reaction to provide a composite hydroxide.

Herein, the average retaining time of the mixed solution in the reactor is controlled to within 4 to 12 hours, pH is controlled to within 10 to 12.5, and the temperature of the reactor is maintained within 50° C. to 80° C. According to another embodiment, pH is set as 10.5 and 11.5. The reason for increasing the temperature at the limitation is that it is hard to provide the high density composite hydroxide since the generated cobalt hydroxide is precipitated as a complex salt at a low temperature. The reacting duration in the reactor ranges from 8 to 30 hours. According to another embodiment, it ranges from 10 to 30 hours.

In the second step, the transition element mixed aqueous solution having a constant concentration distribution is introduced into a reactor, and simultaneously an ammonia aqueous solution and a basic aqueous solution are supplied thereto. Herein, in order to provide the external bulk part surrounding the first metal hydroxide precipitate in which the metal composition is continuously distributed in a concentration gradient, another mixed metal aqueous solution having a different composition is continuously added into the mixed metal aqueous solution having a constant metal composition. The metal composition and the gradient of the external bulk part are controlled by the composition and the supplying rate of the mixed metal aqueous solution supplied into the raw material tank. The thickness of the external bulk part in which the metal composition is continuously distributed in a concentration gradient is determined by controlling the duration for synthesizing the external bulk part precursor in the reactor. Thereby, the precipitate of the second metal hydroxide is surrounded with the surface of the first metal hydroxide precipitate. The reaction duration is controlled within 1 to 10 hours to determine the thickness of the external bulk part layer.

In the first step and the second step, the reaction may be carried out under an atmosphere of nitrogen, pH 10 to 12.5, a temperature of 30 to 80° C., and a reaction agitation speed of 500 to 2000 rpm.

In the third step, the precipitate is dried to provide an internal bulk part and an external bulk part including the metal oxide in which the metal is continuous contributed in a concentration gradient. The drying process is performed at a temperature of between 110° C. and 200° C. for 15 to 30 hours. Further, the metal oxide in which the metal is continuously distributed may be provided by heating the precipitate. The heat treatment is preformed at a temperature of between 400 and 550° C. for 4 to 10 hours.

In the fourth step, a lithium salt is added to the active material precursor including the internal bulk part and the external bulk part including the metal hydroxide or the metal oxide such that the metal is continuously distributed to provide an active material. Herein, the final active material includes the internal bulk part and the external bulk part including a lithium composite metal oxide in which the metal composition is distributed in a continuous concentration gradient. The heating process is performed at a temperature of between 700° C. and 1100° C. after mixing the active material precursor and the lithium salt. The heating process may be performed under an oxidation atmosphere of air or oxygen for 10 to 30 hours. Before the heating process, it is maintained at a temperature between 250 to 650° C. for 5 to 20 hours as a pre-firing process. In addition, an annealing process is further included at a temperature from 600 to 750° C. for 10 to 20 hours after the heating process.

The reactor is mounted with reverse rotating blades, 1 to 4 baffle(s) leaving a space to the inner wall of 2 to 3 cm, and a cylinder disposed between the baffle and the rotating blades in order to provide a uniform mixture between the upper and lower parts inside the reactor. As does the reverse blades, the space between the baffle and the inner wall of the reactor helps to solve local non-uniformity by changing the stream strength and direction and enlarging the turbulence effect. Accordingly, because the present invention uses the reactor, the tap density of the composite hydroxide is improved by 10% over than that of the conventional reactor. The tap density of the composite hydroxide is 1.75 g/cm$^3$ or more. According to another embodiment, it is 2.0 g/cm$^3$ or more. According to yet another embodiment, it is 2.2 g/cm$^3$.

The provided positive active material includes the internal bulk part and the external bulk part in which the metal composition is distributed in a continuous concentration gradient and has a specific surface area of 0.1 m$^2$/g or more. According to another embodiment, it ranges from 0.1 to 3 m$^2$/g. When the specific surface area is less than 0.1 m$^2$/g, the reactivity inside the battery is decreased and the battery characteristics are remarkably deteriorated.

The present invention provides a lithium battery including the positive active material having a structure in which the metal composition is distributed in a continuous concentration gradient between the internal bulk part and the external bulk part. The lithium battery includes a positive electrode including the aforementioned positive active material, a negative electrode including a negative active material, and a separator interposed between them. Further, it includes an electrolyte immersing the positive electrode, the negative electrode, and the separator.

The negative active material includes a material capable of reversibly intercalating/deintercalating lithium ions, and examples thereof include artificial graphite, natural graphite, graphite carbon fiber, and so on. The metal lithium may be used for a negative active material. The electrolyte may include a liquid electrolyte solution including a lithium salt and a non-aqueous organic solvent, or a polymer gel electrolyte.

The present invention is further explained in more detail with reference to the following examples. These examples, however, should not in any sense be interpreted as limiting the scope of the present invention.

Example 1

Preparation of Positive Active Material 4 liters of distilled water were introduced into a co-precipitation reactor (4 L, rotating motor output 80 W or more), supplied with nitrogen gas at a rate of 0.5 liter/min, and agitated at 1000 rpm while maintaining a reactor temperature of 50° C. while dissolved oxygen was removed.

A 2.4 M metal aqueous solution in which nickel sulfate, cobalt sulfate, and manganese sulfate were mixed at a mole ratio of 80:13:7 was continuously added into a reactor at 0.3 liter/hour, and a 4.8 mole ammonia solution was also continuously added into the reactor at 0.03 liter/hour. In addition, a 4.8 mole hydroxide sodium solution was added thereto in order to maintain pH 11.

The speed of an impeller was controlled to 1000 rpm. The average time of retaining the solution in the reactor was maintained at 6 hours by controlling the flowing amount. After the reaction is reached at the stationary state, the reactant is continued for the retaining time on the stationary state to obtain the denser composite metal hydroxide.

When the particle size of the composite metal hydroxide that is reached under the normal condition ranges from 8 and 13 μm, the capacity of the metal aqueous solution of nickel sulfate, cobalt sulfate, and manganese sulfate was kept at 4 L. Then, the reaction was continued using a metal aqueous solution of which the molar ratio of nickel sulfate, cobalt sulfate, and manganese sulfate was continuously changed from 80:13:7 to 40:40:20 in order to provide an external bulk part having a concentration distribution thereof.

When the molar ratio of the metal aqueous solution reached 40:40:20, the reaction was continued at this molar ratio until reaching the normal condition to obtain a spherical nickel-manganese-cobalt composite hydroxide having a concentration gradient. The metal composite hydroxide was filtered, washed with water, and dried with an air dryer at 110° C. for 15 hours.

The metal composite hydroxide and lithium hydroxide (LiOH) were mixed at a molar ratio of 1:1.07 m and heated at a ratio of 2° C./min. Then, it was kept at 500° C. for 10 hours to perform the pre-firing and fired at 780° C. for 20 hours to provide a positive active material powder of which the internal bulk part was composed of $Li[Ni_{0.8}Co_{0.13}Mn_{0.07}]O_2$ and the external bulk part was composed of from $Li[Ni_{0.8}Co_{0.13}Mn_{0.07}]O_2$ to $Li[Ni_{0.4}Co_{0.4}Mn_{0.2}]O_2$ while continuously changing the concentration with a gradient.

Example 2

Preparation of Positive Active Material

A positive active material powder was prepared in accordance with the same procedure as in Example 1, except that the composition of the internal bulk part was $LiNi_{0.8}Co_{0.1}Mn_{0.1}O_2$ and that of the external bulk part was composed of $LiNi_{0.8}Co_{0.1}Mn_{0.1}O_2$ to $LiNi_{0.5}Co_{0.2}Mn_{0.3}O_2$ in a continuous concentration gradient between the two components.

Example 3

Preparation of Positive Active Material

A positive active material powder was prepared in accordance with the same procedure as in Example 1, except that the composition of the internal bulk part was $LiNi_{0.8}Co_{0.1}Mn_{0.1}O_2$ and that of the external bulk part was composed of from $LiNi_{0.8}Co_{0.1}Mn_{0.1}O_2$ to $LiNi_{0.475}Co_{0.05}Mn_{0.475}O_2$ in a continuous concentration gradient between the two components. Herein, the external part bulk composition of $LiNi_{0.475}Co_{0.05}Mn_{0.475}O_2$ had a thermal stability that was better than those of Examples 1 and 2 because Ni was secondary, Co was tertiary, and Mn was quaternary in this composition, and those of Example 1 and Example 2 were Ni-based compositions.

Example 4

Preparation of Positive Active Material

A positive active material was prepared in accordance with the same procedure as in Example 1, except that the external bulk part was prepared by reacting the metal aqueous solution in which the molar ratio of nickel sulfate, cobalt sulfate, manganese sulfate, and aluminum metal was changed from 80:10:5:5 to 40:30:15:15. The internal bulk part was $Li[Ni_{0.8}Co_{0.1}Mn_{0.05}Al_{0.05}]O_2$ and the external bulk part had a continuous gradient of the concentration of from $Li[Ni_{0.8}Co_{0.1}Mn_{0.05}Al_{0.05}]O_2$ to $Li[Ni_{0.4}Co_{0.3}Mn_{0.15}Al_{0.15}]O_2$.

Comparative Example 1

Preparation of Positive Active Material

A positive active material of $Li[Ni_{0.8}Co_{0.1}Mn_{0.1}]O_2$ was prepared.

Comparative Example 2

Preparation of Positive Active Material

A positive active material powder was prepared by the same procedure as in Example 1, except that the molar ratio of the metal aqueous solution of nickel sulfate, cobalt sulfate, and manganese sulfate was fixed at 80:10:10. Thus, the internal bulk part was composed of $Li[Ni_{0.8}Co_{0.13}Mn_{0.07}]O_2$, and the external bulk part was composed of $Li[Ni_{0.8}Co_{0.1}Mn_{0.1}]O_2$ but the concentration was not changed.

Fabrication of Rechargeable Lithium Battery

Each positive active material prepared in accordance with procedures of Examples 1 to 4 and Comparative Example 1 was mixed with a conductive material of acetylene black and a binder of polyvinylidene fluoride (PVdF) at a weight ratio of 80:10:10 to provide a slurry. The slurry was uniformly coated on a 20 μm thick aluminum foil and dried at 120° C. under vacuum to provide a positive electrode for a rechargeable lithium cell.

With the aforementioned positive electrode, the counter electrode of a lithium foil, a separator of a porous polyethylene membrane (manufactured by Celgard LLC, Celgard 2300, thickness: 25 μm), and a liquid electrolyte solution in which $LiPF_6$ was dissolved in a mixed solvent (ethylene carbonate and diethyl carbonate at a volume ratio of 1:1) at a 1 M concentration, a coin cell was fabricated in a commonly known process.

Figure 2:
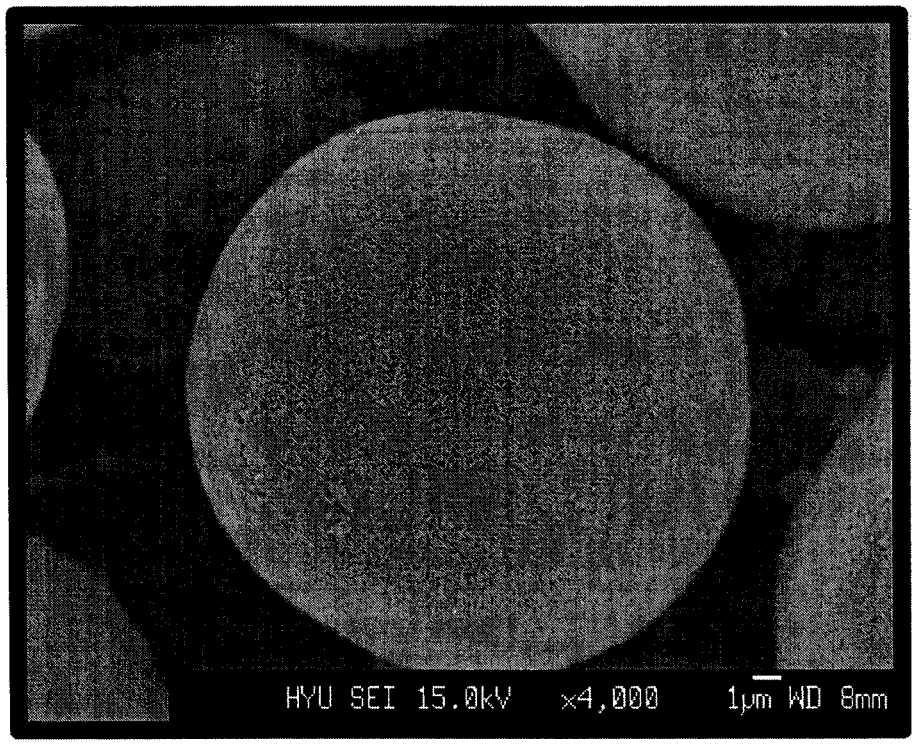
FIG. 2 is a 4000-times FE-SEM magnified photograph showing a $([Ni_{0.8}Co_{0.13}Mn_{0.07}]_{0.6}[Ni_{0.4}Co_{0.4}Mn_{0.2}]_{0.4})$ $(OH)_2$ powder of the positive active material precursor fabricated from Example 1, which has a concentration gradient.

FIG. 1 is a 500-times magnified FE-SEM photograph of the obtained metal hydride powder that the active material precursor $([Ni_{0.8}Co_{0.13}Mn_{0.07}]_{0.6}[Ni_{0.4}Co_{0.4}Mn_{0.2}]_{0.4})(OH)_2$ according to Example 1 was dried at 110° C. for 15 hours in an air dryer. FIG. 2 is a 400-times magnified FE-SEM photograph thereof. The precursor composed of the internal bulk part and the external bulk part was confirmed to have the nickel-manganese-cobalt composite hydroxide in a spherical shape.

Figure 3:
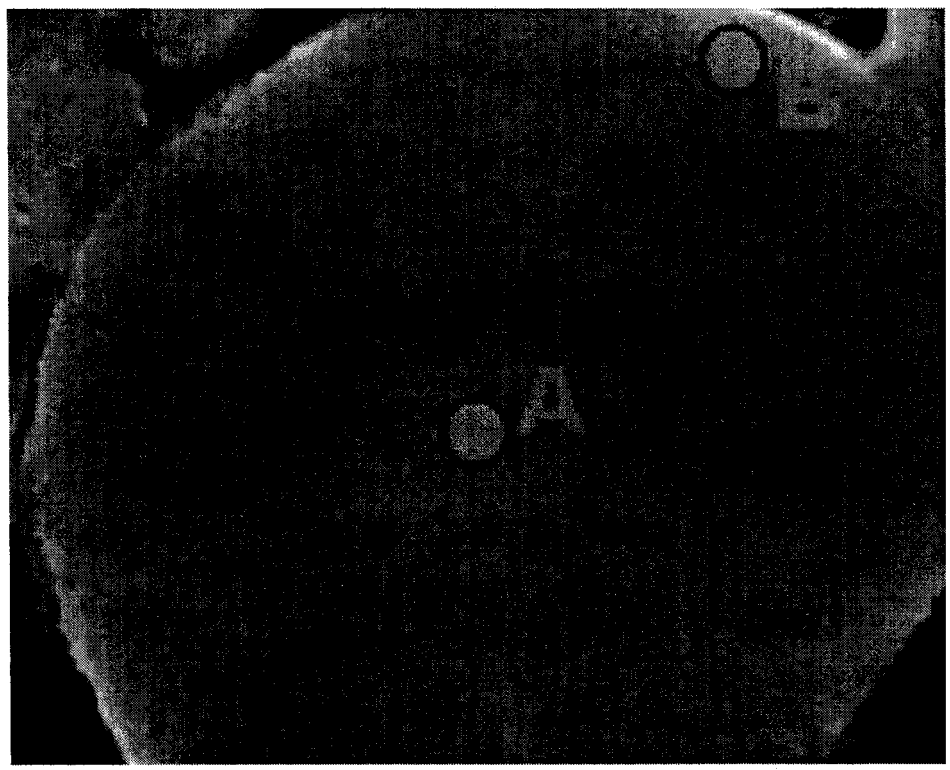
FIG. 3 is a FE-SEM photograph showing a cross-sectional view of the positive active material precursor of a $([Ni_{0.8}Co_{0.13}Mn_{0.07}]_{0.6}[Ni_{0.4}Co_{0.4}Mn_{0.2}]_{0.4})(OH)_2$ powder having a concentration gradient fabricated from Example 1.
Figure 4:
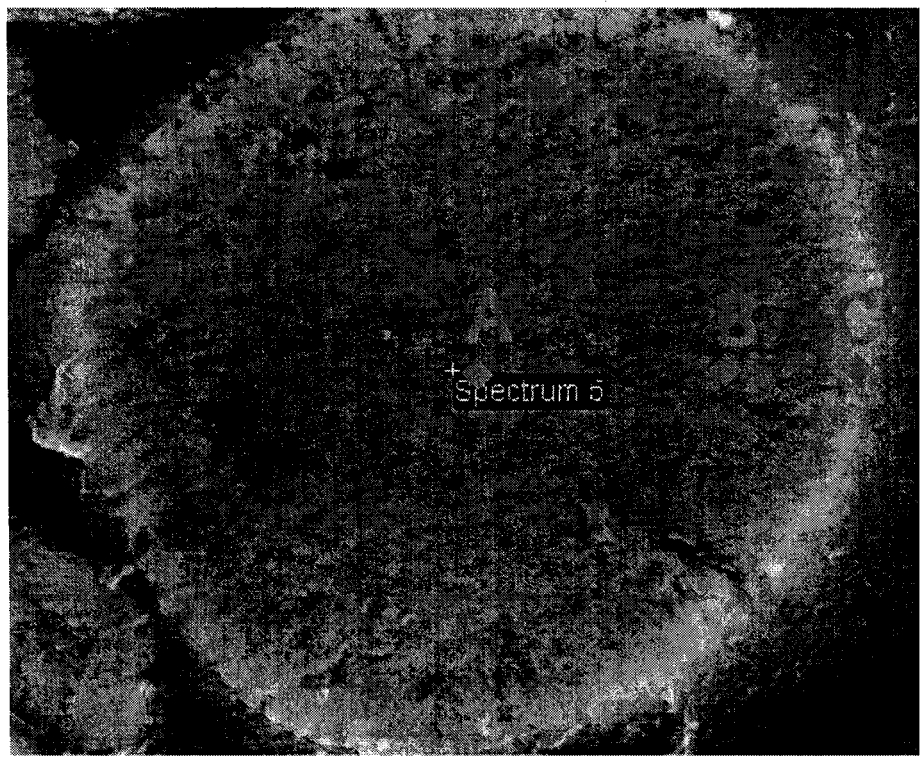
FIG. 4 is a FE-SEM photograph showing a cross-sectional view of the positive active material precursor of $Li([Ni_{0.8}Co_{0.13}Mn_{0.07}]_{0.6}[Ni_{0.4}Co_{0.4}Mn_{0.2}]_{0.4})O_2$ powder having a concentration gradient fabricated from Example 1.

FIG. 3 is an FE-SEM photograph showing a cross-sectional view of a positive active material precursor powder $([Ni_{0.8}Co_{0.13}Mn_{0.07}]_{0.6}[Ni_{0.4}Co_{0.4}Mn_{0.2}]_{0.4})(OH)_2$ having a concentration gradient fabricated from Example 1, which has a concentration gradient. In addition, FIG. 4 is an FE-SEM photograph showing a cross-sectional view of a positive active material precursor powder $Li([Ni_{0.8}Co_{0.13}Mn_{0.07}]_{0.6}[Ni_{0.4}Co_{0.4}Mn_{0.2}]_{0.4})O_2$ having a concentration gradient fabricated from Example 1. In order to confirm the concentration distribution of the internal powder, EDX composition analysis was performed at A and B markers in FIG. 3 and A, B, and C markers in FIG. 4. The EDX analysis (the metal ions showed the average composition because the X-ray was passed from the surface to the powder surface) showed that the precursor powder was well synthesized along to the designed composition. In the case of the firing powder, the concentration distribution difference was slightly decreased due to the metal ions that were diffused during the high temperature firing step. However, it was confirmed that the concentrations of Ni, Co, and Mn metal elements were continuously distributed.

TABLE 1

Internal Composition Analysis for Powder
($[Ni_{0.8}Co_{0.13}Mn_{0.07}]_{0.6}[Ni_{0.4}Co_{0.4}Mn_{0.2}]_{0.4}$)(OH)$_2$ and Powder
Li($[Ni_{0.8}Co_{0.13}Mn_{0.07}]_{0.6}[Ni_{0.4}Co_{0.4}Mn_{0.2}]_{0.4}$)O$_2$

| | Analysis position | Ni (mole %) | Co (mole %) | Mn (mole %) |
|---|---|---|---|---|
| ($[Ni_{0.8}Co_{0.13}Mn_{0.07}]_{0.6}$ $[Ni_{0.4}Co_{0.4}Mn_{0.2}]_{0.4}$)(OH)$_2$ | A (Inside) | 77 | 13 | 10 |
| | B (Outside) | 51 | 33 | 16 |
| Li($[Ni_{0.8}Co_{0.13}Mn_{0.07}]_{0.6}$ $[Ni_{0.4}Co_{0.4}Mn_{0.2}]_{0.4}$)O$_2$ | A (Inside) | 71 | 21 | 8 |
| | C (Starting position of external bulk part) | 64 | 24 | 12 |
| | B (Outside) | 60 | 27 | 13 |

Figure 5:
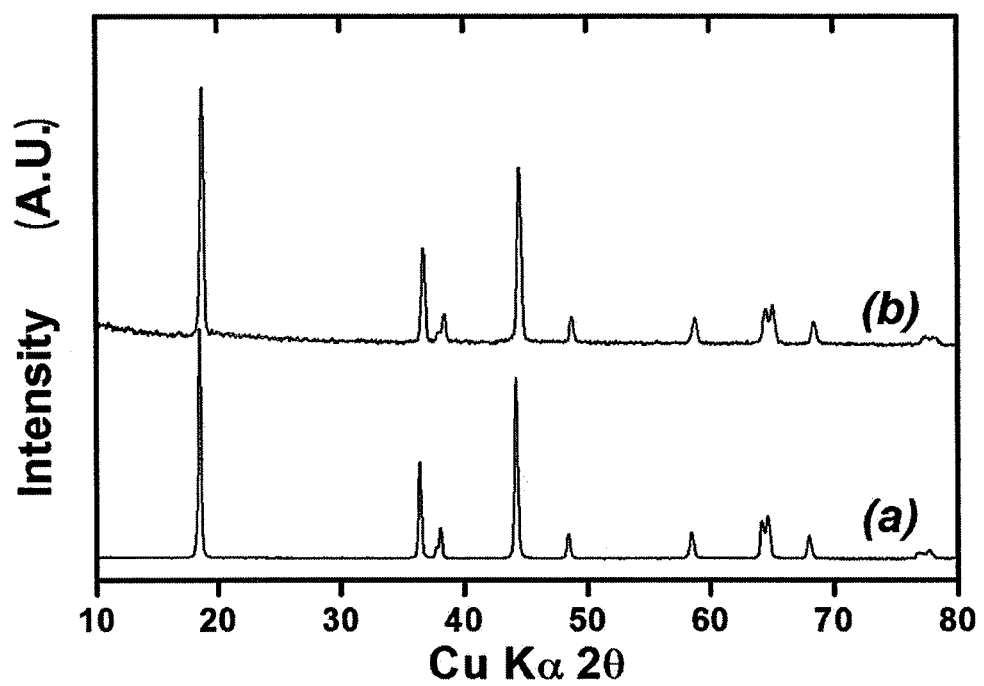
FIG. 5 is a X-ray diffraction pattern (XRD) of (a) a positive active material powder $(Li[Ni_{0.8}Co_{0.1}Mn_{0.1}]O_2)$ according to Comparative Example 1 and (b) a positive active material powder $(Li([Ni_{0.8}Co_{0.13}Mn_{0.07}]_{0.6}[Ni_{0.4}Co_{0.4}Mn_{0.2}]_{0.4})O_2)$ having a concentration gradient according to Example 1.

FIG. 5 is an X-ray diffraction pattern (XRD) of (a) a firing powder (Li[$Ni_{0.8}Co_{0.1}Mn_{0.1}$]O$_2$) according to Comparative Example 1 and (b) a firing powder (Li($[Ni_{0.8}Co_{0.13}Mn_{0.07}]_{0.6}$ $[Ni_{0.4}Co_{0.4}Mn_{0.2}]_{0.4}$)O$_2$) according to Example 1. From the fact that the (006) and (102) peak isolation and (018) and (110) peak isolation were well identified at the diffraction peaks of all powders and the (003) and (104) peak ratios were 1 or more, the lithium composite oxide had a hexagonal NaFeO$_2$ structure having a space group of R$\bar{3}$m. Particularly, it was confirmed that the positive active material with the concentration of the metal composition had a good crystalline layered compound.

Figure 6:
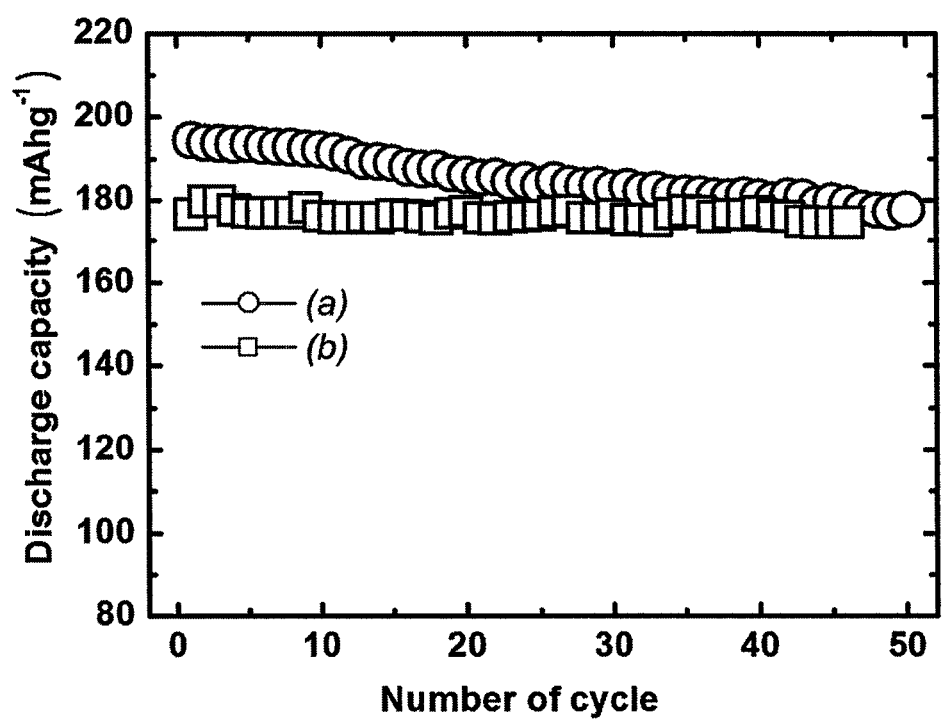
FIG. 6 is a graph showing a charge capacity depending upon cycle repetitions after charging and discharging (a) a cell including a positive active material powder (Li $[Ni_{0.8}Co_{0.1}Mn_{0.1}]O_2)$ according to Comparative Example 1 and (b) a cell including a positive active material powder $Li([Ni_{0.8}Co_{0.13}Mn_{0.07}]_{0.6}[Ni_{0.4}Co_{0.4}Mn_{0.2}]_{0.4})O_2$ having a concentration gradient according to Example 1 at 3.0 to 4.3V and 0.2 C.

Coin cells including positive active materials prepared in accordance with procedures according to Examples 1 to 4 and Comparative Example 1 were evaluated at a range of from 3.0 to 4.3 volts and an applying current of 0.4 mA in an electrochemical analysis device (Toyo System, Toscat 3100U) to determine the discharge capacity depending upon the cycle. Herein, the results for Comparative Example 1 and Example 1 are shown in FIG. 6. Li[$Ni_{0.8}Co_{0.1}Mn_{0.1}$]O$_2$ according to Comparative Example 1 showed a 9% capacity decrease in which the initial capacity of 194 mAh/g was decreased to 177 mAh/g when repeating 50 cycles. In contrast, the positive active material Li($[Ni_{0.8}Co_{0.13}Mn_{0.07}]_{0.6}[Ni_{0.4}Co_{0.4}Mn_{0.2}]_{0.4}$)O$_2$ electrode having a concentration gradient according to Example 1 showed a 2% capacity decrease in which the initial capacity of 177 mAh/g was decreased to 174 mAh/g when repeating 46 cycles. The results were caused by the external bulk part preventing the internal bulk part from reacting with electrolyte solution, differing from the surface reaction of Comparative Example 1.

Figure 7:
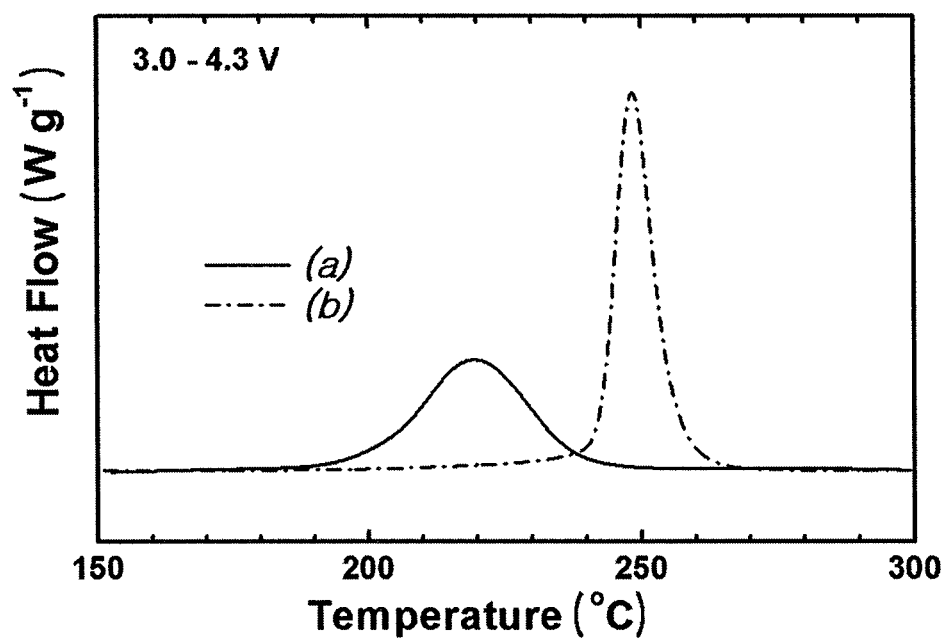
FIG. 7 is a data graph of differential thermogravimetric analysis for the positive active material of which (a) the cell including a positive active material powder (Li $[Ni_{0.8}Co_{0.1}Mn_{0.1}]O_2)$ according to Comparative Example 1 and (b) the cell including a positive active material $Li([Ni_{0.8}Co_{0.13}Mn_{0.07}]_{0.6}[Ni_{0.4}Co_{0.4}Mn_{0.2}]_{0.4})O_2$ according to Example 1 having a concentration gradient are fully charged at 4.3V.

FIG. 7 shows data of differential thermogravimetric analysis for each positive active material of cells according to Example 1 and Comparative Example 1 that were fully charged. Li[$Ni_{0.8}Co_{0.1}Mn_{0.1}$]O$_2$ according to Comparative Example 1 began to emit heat and had a main exothermal peak at 220° C. On the other hand, the positive active material Li($[Ni_{0.8}Co_{0.13}Mn_{0.07}]_{0.6}[Ni_{0.4}Co_{0.4}Mn_{0.2}]_{0.4}$)O$_2$ having a concentration gradient according to Example 1 began to emit heat at 240° C., which was 50° C. higher than when the Li[$Ni_{0.8}Co_{0.1}Mn_{0.1}$]O$_2$ according to Comparative Example began to emit heat and had a main exothermal peak at 249° C. The result showed that the external bulk part remarkably improved the thermal stability of the internal bulk part in the positive active material having a concentration gradient.

Figure 8:
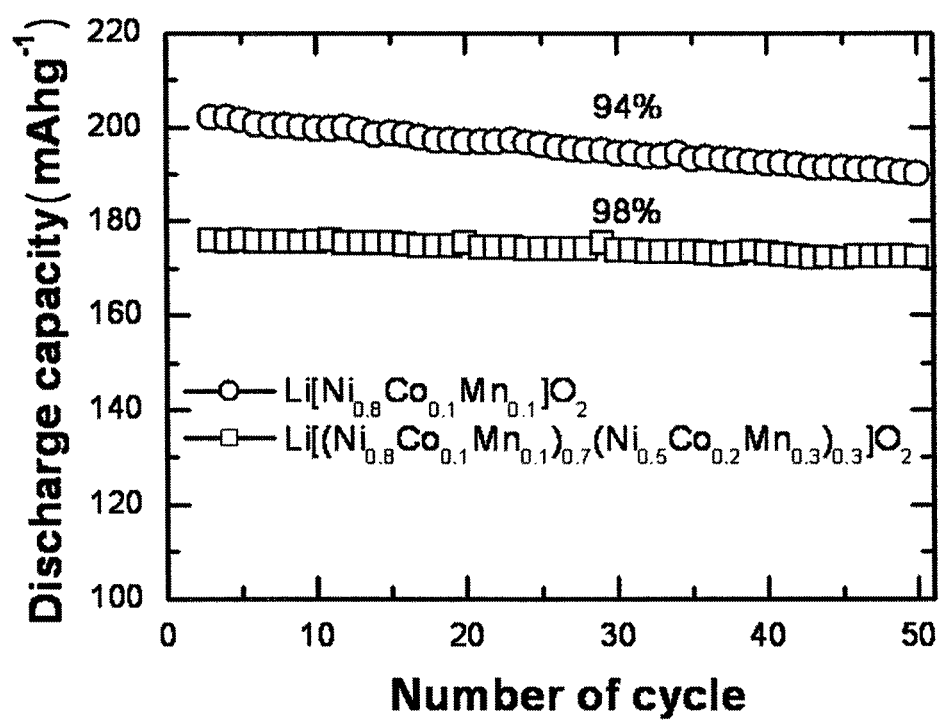
FIG. 8 is a discharge capacity graph depending upon cycle repetitions in which (a) the cell including a positive active material powder $(Li[Ni_{0.8}Co_{0.1}Mn_{0.1}]O_2)$ according to Comparative Example 1 and (b) the cell including a positive active material $Li([Ni_{0.8}Co_{0.1}Mn_{0.1}]_{0.7}[Ni_{0.5}Co_{0.2}Mn_{0.3}]_{0.3})O_2$ according to Example 2 are charged and discharged at 3.0 to 4.3V and at 0.2C.

FIG. 8 shows the discharge capacity depending upon the cycle of each positive active material fabricated from Comparative Example 1 and Example 2. The charge and discharge test conditions were the same as for Example 1. When the positive active material according to Comparative Example 1 was repeated for 50 cycles, the discharge capacity was maintained at a 94% level comparing to the initial capacity. On contrast, the positive active material Li($[Ni_{0.8}Co_{0.1}Mn_{0.1}]_{0.7}$ $[Ni_{0.5}Co_{0.2}Mn_{0.3}]_{0.3}$)O$_2$ electrode having a concentration gradient according to Example 2 had a slightly lower initial capacity of 178 mAh/g, but had an excellent cycle characteristic of 98% after repeating 50 cycles.

Figure 9:
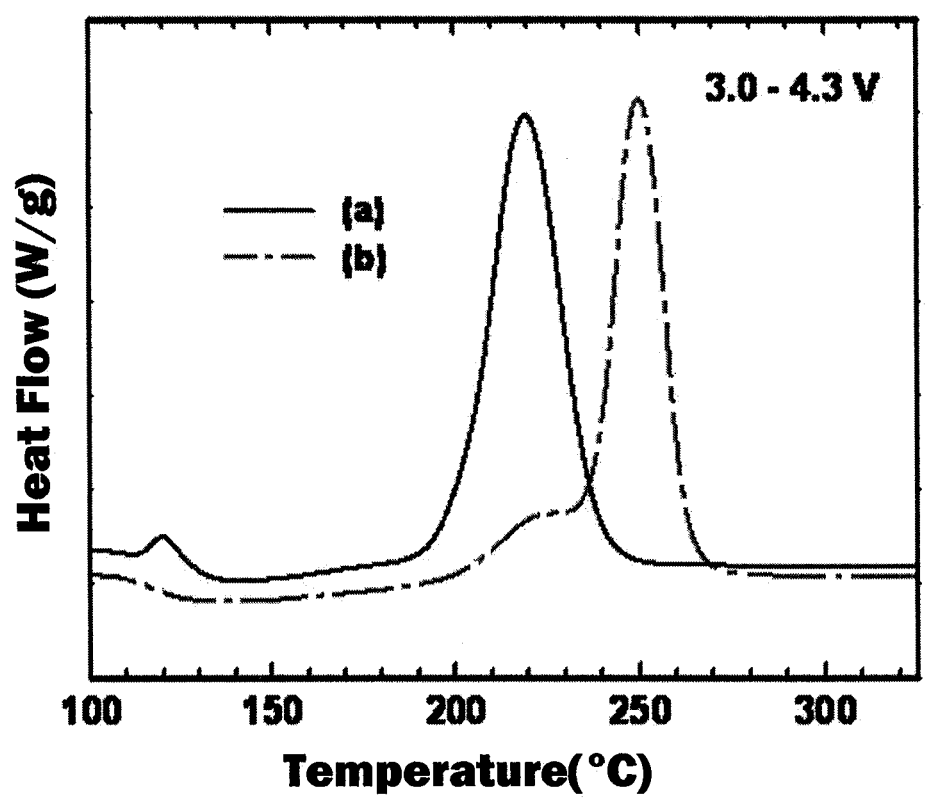
FIG. 9 is a data graph of differential thermogravimetric analysis for the positive active material of which (a) the cell including the positive active material powder (Li $[Ni_{0.8}Co_{0.1}Mn_{0.1}]O_2)$ according to Comparative Example 1 and (b) the cell including the positive active material $Li([Ni_{0.8}Co_{0.1}Mn_{0.1}]_{0.7}[Ni_{0.5}Co_{0.2}Mn_{0.3}]_{0.3})O_2$ having a concentration gradient according to Example 2 are fully charged at 4.3V.

FIG. 9 shows a data graph of differential thermogravimetric analysis for each positive active material according to Comparative Example 1 and Example 2 after being fully charged at 4.3V. As describing in FIG. 7, Li[$Ni_{0.8}Co_{0.1}Mn_{0.1}$]O$_2$ emitted heat at 190° C. and had a main exothermal peak at 220° C., and in contrast, the positive active material Li($[Ni_{0.8}Co_{0.1}Mn_{0.1}]_{0.7}[Ni_{0.5}Co_{0.2}Mn_{0.3}]_{0.3}$)O$_2$ having a concentration gradient started to emit heat at 240° C. which was 50° C. higher than Li[$Ni_{0.8}Co_{0.1}Mn_{0.1}$]O$_2$ according to Comparative Example 1 and had a main exothermal peak at 250° C. Differing from the positive active material having a concentration gradient according to Example 1, the exothermal volume was remarkably decreased in the positive active material according to Example 2. The reason is that the external bulk part had a stable structure and a low Ni amount and was densely filled so that the contact of the internal bulk part with the electrolyte solution was prevented to improve the thermal stability when the positive active material had a concentration gradient.

Figure 10:
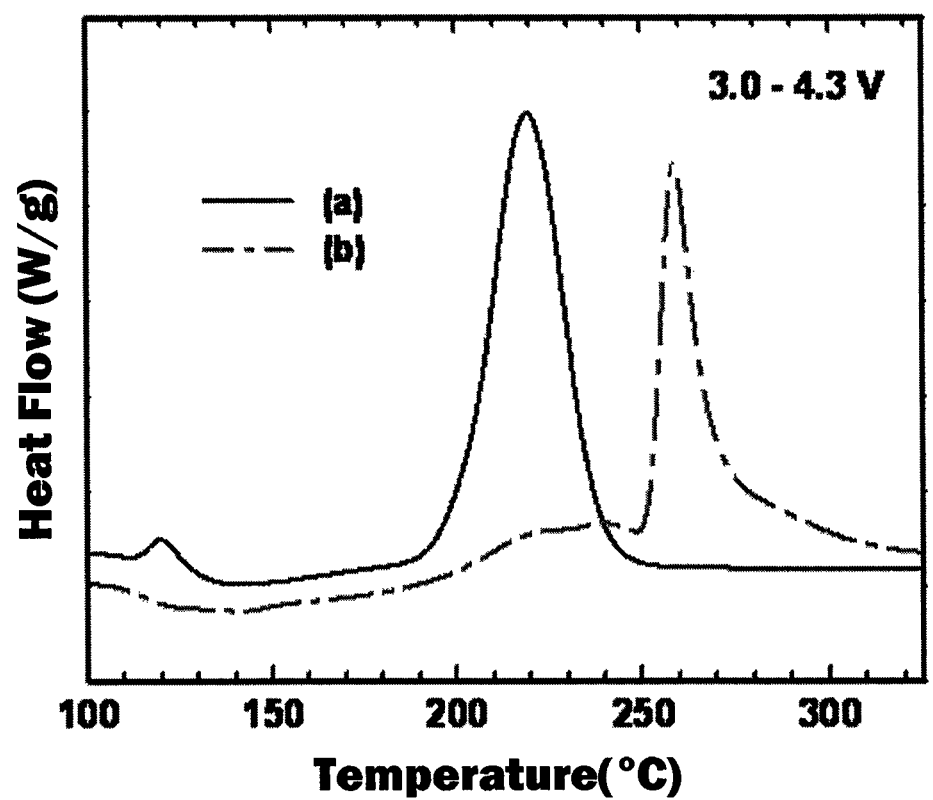
FIG. 10 is a data graph of differential thermogravimetric analysis for the positive active material of which (a) the cell including the positive active material powder (Li $[Ni_{0.8}Co_{0.1}Mn_{0.1}]O_2)$ according to Comparative Example 1 and (b) the positive active material $Li([Ni_{0.8}Co_{0.1}Mn_{0.1}]_{0.7}$ $[Ni_{0.475}Co_{0.05}Mn_{0.475}]_{0.3})O_2$ having a concentration gradient according to Example 3 are fully charged at 4.3V.

FIG. 10 shows differential thermogravimetric analysis data for the positive active material of cells including positive active materials according to Comparative Example 1 and Example 3 that were fully charged at 4.3V. Li[$Ni_{0.8}Co_{0.1}Mn_{0.1}$]O$_2$ started to emit heat at 190° C. and had a main exothermal peak at 220° C. In contrast, the positive active material Li($[Ni_{0.8}Co_{0.1}Mn_{0.1}]_{0.7}$ $[Ni_{0.475}Co_{0.05}Mn_{0.475}]_{0.3}$)O$_2$ having a concentration gradient according to Example 3 started to emit heat at 250° C. which was 60° C. higher than that of Li[$Ni_{0.8}Co_{0.1}Mn_{0.1}$]O$_2$ according to Comparative Example 1 and had a main exothermal peak of 260° C. The positive active material according to Example 3 had more thermal stability than that of Example 1 because the external bulk part of that according to Example 3 had more thermal stability than that of Example 1.

As shown above, the positive active material according to one embodiment of the present invention is composed of an internal bulk part and an external bulk part having a continuous concentration gradient of the metal composition. Thereby, the obtained positive active material has excellent life-cycle characteristics and thermal stability since the internal bulk part includes a high capacity Ni-based positive active material and the external bulk part that contacts the electrolyte includes a very safe Ni-based or tertiary (Li[$Ni_xCo_{1-2x}Mn_x$]O$_2$) laminated positive active material.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A positive active material for a lithium battery, comprising:
an internal bulk part and an external bulk part surrounding the internal bulk part,
wherein
a metal composition is distributed in a continuous concentration gradient from the interface between the internal bulk part and the external bulk part to a surface of the active material
the internal bulk part comprises a first compound including Ni, Co, and Mn, wherein the Ni in the first compound ranges from 60 mole % to 95 mole %, and
the external bulk part comprises a second compound including Ni, and Mn, wherein the Ni in the second compound ranges from 5 mole % to 60 mole %,
wherein
the positive active material is spherical in shape;
at least one of the internal bulk part and the external bulk part has a layered crystalline structure;
metal composition of the external bulk part is distributed in a continuous concentration gradient; and prepared by:
(i) mixing a metal salt aqueous solution comprising nickel, cobalt, manganese, and optionally a metal, wherein the metal is at least one element selected from the group consisting of Mg, Al, Cr, V, Ti, Cr, Fe, Zr, Zn, Si, Y, Nb, Ga, Sn, Mo, W, and combinations thereof, a chelating agent, and a basic aqueous solution in a reactor to provide a first metal hydroxide precipitate, wherein the chelating agent and the metal salt aqueous solution are mixed in a mole ratio of 0.2 to 0.5:1;
(ii) introducing metal mixture solutions with different concentrations to the reactor, and simultaneously introducing an ammonia aqueous solution and a basic aqueous solution into the reactor to provide a second metal hydroxide precipitate on a surface of the first metal hydroxide precipitate with a concentration gradient;
(iii) drying or heating at least one of first metal hydroxide precipitates and the second metal hydroxide precipitates to provide an active material precursor; and
(iv) creating a positive active material by mixing the active material precursor and a lithium salt.

2. The positive active material of claim 1, wherein the volume of the internal bulk part ranges from 35 to 95 volume % based on the total volume of the positive active material.

3. The positive active material of claim 1, wherein the metal concentration in the surface part of the external bulk part is at least 10% more than that of the internal bulk part.

4. The positive active material of claim 1, wherein the internal bulk part comprises lithium-included compounds represented by $Li_aNi_{1-x-y-z}Co_xMn_yM_zO_{2-\delta}X_\delta$ ("Formula 1"), and the external bulk part is selected from the group consisting of compounds represented by $Li_aNi_{1-x-y-z}Co_xMn_yM_zO_{2-\delta}X_\delta$ ("Formula 2") and $Li_aNi_xCo_{1-2x}Mn_{x-y}M_yO_{2-\delta}X_\delta$ ("Formula 3"), and a mixture thereof:
wherein, in the formula 1, $0.95 \le a \le 1.2$, $0.01 \le x \le 0.5$, $0.01 \le y \le 0.5$, $0.005 \le z \le 0.3$, $0.05 \le x+y+z \le 0.4$, M is at least one element selected from the group consisting of Mg, Al, Cr, V, Ti, Cr, Fe, Zr, Zn, Si, Y, Nb, Ga, Sn, Mo, W, and combinations thereof, X is a halogen of F, Cl, Br, or I, and $0 \le \delta \le 0.1$;
wherein, in the Formula 2, $0.95 \le a \le 1.2$, $0.01 \le x \le 0.4$, $0.01 \le y \le 0.5$, $0.002 \le z \le 0.2$, $0.4 < x+y+z \le 0.95$, M is at least one element selected from the group consisting of Mg, Al, Cr, V, Ti, Cr, Fe, Zr, Zn, Si, Y, Nb, Ga, Sn, Mo, W, and combinations thereof, X is a halogen of F, Cl, Br, or I, and $0 \le \delta \le 0.1$; and
wherein, in the Formula 3, $0.95 \le a \le 1.2$, $0.01 \le x \le 0.5$, $0 \le y \le 0.1$, M is at least one element selected from the group consisting of Mg, Al, Cr, V, Ti, Cr, Fe, Zr, Zn, Si, Y, Nb, Ga, Sn, Mo, W, and combinations thereof, X is a halogen of F, Cl, Br, or I, and $0 \le \delta \le 0.1$.

5. The positive active material of claim 1, wherein the internal bulk part has an average particle diameter of 5 to 15 μm, and the positive active material particle has an average particle diameter of 10 to 30 μm.

6. A lithium battery comprising:
a positive electrode including the positive active material of claim 1;
a negative active material including a negative active material; and
an electrolyte, wherein;
the positive active material comprises an internal bulk part and an external bulk part surrounding the internal bulk part,
a metal composition is distributed in a continuous concentration gradient from an interface between the internal bulk part and the external bulk part to the active material's surface,
the internal bulk part comprises a first compound including Ni, Co, and Mn, wherein the Ni in the first compound ranges from 60 mole % to 95 mole %, and
the external bulk part comprises a second compound including Ni, and Mn, wherein the Ni in the second compound ranges from 5 mole % to 60 mole %,
wherein the positive active material is spherical in shape.

7. The lithium battery of claim 6, wherein the internal bulk part's volume and the external bulk part has a layered crystalline structure.

8. The lithium battery of claim 6, wherein the metal composition of the external bulk part is distributed in a continuous concentration gradient.

9. The lithium battery of claim 6, wherein the internal bulk part's volume ranges from 35 to 95 volume % based on the total volume of the positive active material.

10. The lithium battery of claim 6, wherein the metal concentration in the external bulk part's surface is 10% to 70% relative to the metal concentration of the internal bulk part.

11. The lithium battery of claim 6, wherein the internal bulk part comprises a high capacity compound comprising Ni, Co, and Mn, and the external bulk part comprises a thermally stable compound comprising Ni and Mn.

12. The lithium battery of claim 6, wherein the internal bulk part comprises lithium-included compounds represented by $Li_aNi_{1-x-y-z}Co_xMn_yM_zO_{2-\delta}X_\delta$ ("Formula 1"), and the external bulk part is selected from the group consisting of compounds represented by $Li_aNi_{1-x-y-z}Co_xMn_yM_zO_{2-\delta}X_\delta$ ("Formula 2") and $Li_aNi_xCo_{1-2x}Mn_{x-y}M_yO_{2-\delta}X_\delta$ ("Formula 3"), and a mixture thereof:
wherein, in the formula 1, $0.95 \le a \le 1.2$, $0.01 \le x \le 0.5$, $0.01 \le y \le 0.5$, $0.005 \le z \le 0.3$, $0.05 \le x+y+z \le 0.4$, M is at least one element selected from the group consisting of Mg, Al, Cr, V, Ti, Cr, Fe, Zr, Zn, Si, Y, Nb, Ga, Sn, Mo, W, and combinations thereof, X is a halogen of F, Cl, Br, or I, and $0 \le \delta \le 0.1$;
wherein, in the Formula 2, $0.95 \le a \le 1.2$, $0.01 \le x \le 0.4$, $0.01 \le y \le 0.5$, $0.002 \le z \le 0.2$, $0.4 < x+y+z \le 0.95$, M is at least one element selected from the group consisting of Mg, Al, Cr, V, Ti, Cr, Fe, Zr, Zn, Si, Y, Nb, Ga, Sn, Mo, W, and combinations thereof, X is a halogen of F, Cl, Br, or I, and $0 \leq \delta \leq 0.1$; and wherein, in the Formula 3, $0.95 \leq a \leq 1.2$, $0.01 \leq x \leq 0.5$, $0 \leq y \leq 0.1$, M is at least one element selected from the group consisting of Mg, Al, Cr, V, Ti, Cr, Fe, Zr, Zn, Si, Y, Nb, Ga, Sn, Mo, W, and combinations thereof, X is a halogen of F, Cl, Br, or I, and $0 \leq \delta \leq 0.1$.

13. The lithium battery of claim 6, wherein the internal bulk part has an average particle diameter of 5 to 15 μm, and the positive active material has an average particle diameter of 10 to 30 μm.

14. The positive active material of claim 1, wherein the chelating agent and the metal salt aqueous solution are mixed in a mole ratio of 0.2 to 0.5:1.

15. The positive active material of claim 1, wherein the heating of the mixture of the active material precursor and the lithium salt is performed at a temperature of 700° C. to 1100° C.

16. The positive active material of claim 1, further comprising pre-firing the mixture of the active material precursor and the lithium salt at a temperature of 250 to 650° C. for 5 to 20 hours before the heating step.

17. The positive active material of claim 1, wherein the mixing to provide the first metal hydroxide precipitate and the introducing to provide the second metal hydroxide precipitate are performed under an atmosphere of inflowing nitrogen, pH of 10 to 12.5, at a reaction temperature of 30 to 80° C., and a reaction agitation speed of 500 to 2000 rpm.

\* \* \* \* \*